United States Patent [19]

Okisu et al.

[11] Patent Number: 5,831,750
[45] Date of Patent: Nov. 3, 1998

[54] IMAGE READER HAVING HEIGHT DISTRIBUTION CORRECTION FOR A READ DOCUMENT

[75] Inventors: Noriyuki Okisu, Osakasayama; Tetsuya Iida, Hadano; Toru Matsui, Nara; Keiichiro Bungo, Toyokawa, all of Japan

[73] Assignee: Minolta Co., Ltd., Osaka, Japan

[21] Appl. No.: 554,738

[22] Filed: Nov. 7, 1995

[30] Foreign Application Priority Data

Nov. 8, 1994 [JP] Japan ................................ 6-300339

[51] Int. Cl.⁶ ............................ H04N 1/04; G03G 15/00; G03B 27/32
[52] U.S. Cl. .................. 358/493; 358/474; 358/475; 358/488; 355/25; 355/82; 399/362
[58] Field of Search ................................ 358/474, 475, 358/488, 493, 444, 404, 296, 482, 483; 355/25, 82, 55, 75; 399/361, 362, 363, 371, 395

[56] References Cited

U.S. PATENT DOCUMENTS

| | | | |
|---|---|---|---|
| 4,910,601 | 3/1990 | Gerlach | 358/474 |
| 5,084,611 | 1/1992 | Okisu et al. | 358/488 |
| 5,119,206 | 6/1992 | Rourke et al. | 358/296 |
| 5,194,729 | 3/1993 | Okisu et al. | 250/222.1 |
| 5,247,330 | 9/1993 | Ohyama et al. | 355/64 |
| 5,247,755 | 9/1993 | Sato et al. | 40/476 |
| 5,276,530 | 1/1994 | Siegel | 358/406 |
| 5,377,019 | 12/1994 | Okisu et al. | 358/464 |
| 5,416,609 | 5/1995 | Matsuda et al. | 358/474 |
| 5,497,236 | 3/1996 | Wolff et al. | 358/474 |
| 5,585,926 | 12/1996 | Fujii et al. | 358/474 |
| 5,610,720 | 3/1997 | Fujioka et al. | 358/296 |

FOREIGN PATENT DOCUMENTS 0264857 11/1986 Japan.
3274196 12/1991 Japan.

*Primary Examiner*—Edward L. Coles
*Assistant Examiner*—Madeleine Au Nguyen
*Attorney, Agent, or Firm*—Sidley & Austin

[57] ABSTRACT

An image reading apparatus which reads document surfaces of open book-like documents placed on a document platen in a face upward condition and detects height of the document to control an image reading operation. An image reader reads the document platen on which the document is placed and outputs image data. A height detector detects height distribution of the document, and a discrimination device determines whether or not abnormalities occur in the height distribution of the document. A memory stores the height distribution of the document, and a update device updates the height distribution of the document stored in the memory when the abnormalities do not occur in the height distribution of the document. A correcting device corrects distortion of the image data caused by the height of the document in accordance with the height distribution of the document stored in the memory.

24 Claims, 16 Drawing Sheets

IMAGE READER HAVING HEIGHT DISTRIBUTION CORRECTION FOR A READ DOCUMENT

BACKGROUND OF THE INVENTION

1. Field of the Invention

The present invention relates to an image reader for reading original documents placed on a document platen.

2. Description of the Related Art

In conventional image readers of the aforesaid type, when an open-faced book-like document is read from above, there may be unevenness in the height of the document caused by curvature of the document surface at the region at which the open pages are joined, such that focusing during reading and curvature correction of the read image are performed so as to achieve accurate image reproduction. (Refer to U.S. patent application Ser. No. 5,084,661 and U.S. Ser. No. 08/058,574.)

As shown in FIG. 20, the side surface of the original document reflected in inclined mirror 205 is read by image reader 202 to detect the height of the original document. In this device, the shape of the side surface of the document is recognized from the difference in luminescence between the background area and the side surface of the document reflected in mirror 205. When the background area reflects visible light such as that of interior room illumination of fluorescent lights and the like, however, the difference in luminescence between the document side surface and background area is lost, such that the shape of the document side surface cannot be recognized, and the height of the document cannot be accurately measured. Thus, focusing and image curvature correction cannot be accurately accomplished in the area whose height cannot be accurately measured, thereby producing disturbance of the output image. In regard to data considering measurement anomalies relative to the actual height of a document separate from measured document height data, the present applicants previously have proposed an abnormal data correction method (Japanese Patent Application No. HEI 5-169722). In this method also, adequate correction cannot be accomplished when there is insufficient correct height data.

SUMMARY OF THE INVENTION

A first object of the present invention is to reduce erroneous detection of height distribution of book-like documents using image distortion correction in a device for reading an open-faced book-like document disposed in an open state facing upward.

A second object of the present invention is to provide, in a device for reading an open-faced book-like document surface disposed face upward as said pages are turned, image distortion correction even when accurate height data cannot be measured, by storing in memory the book document height distribution which is read once and remains unchanged for one to two pages, and using said stored height distribution data to correct height data when measurement anomalies are generated during subsequent document reading.

A third object of the present invention is to provide, in a device for reading an open-faced book-like document surface disposed face upward as said pages are turned, image distortion correction even when accurate height data cannot be measured, by storing in memory a typical distribution model of the document height and using said stored height distribution data to correct height data when measurement anomalies are generated.

A fourth object of the present invention is to provide, in a device for reading an open-faced book-like document surface disposed face upward as said pages are turned, a reduced time required for reading a document 6, storing in memory the book document height distribution which is read once and remains unchanged for one to two pages, and using said stored height distribution data during subsequent document reading so as to eliminate prescanning.

A fifth object of the invention is to provide, in an image reading device for reading a thick document such as a book or the like placed on a document platen, an image reader comprising an image sensing means for reading documents, height detecting means for detecting a document height distribution, correcting means for correcting distortion of a document caused by the height of said document in accordance with the height distribution of said document, memory means for storing document height distribution data detected by said height detecting means during previous image sensing, discrimination means for determining whether or not abnormalities occur in document height distribution data detected during subsequent image sensing, wherein document distortion is corrected using document height distribution data from previous image sensing when abnormalities occur in the document height distribution.

A sixth object of the present invention is to provide, in an image reading device for reading a thick document such as a book or the like placed on a document platen, an image reader comprising an image sensing means for reading documents, height detecting means for detecting a document height distribution, correcting means for correcting unsharp focus arising from the document height in accordance with the height distribution of said document, memory means for storing document height distribution data detected by said height detecting means during previous image sensing, discrimination means for determining whether or not abnormalities occur in document height distribution data detected during subsequent image sensing, wherein unsharp focus is corrected using document height distribution data from previous image sensing when abnormalities occur in the document height distribution.

A seventh object of the present invention is to provide, in an image reading device for reading a thick document such as a book or the like placed on a document platen, an image reader comprising an image sensing means for reading documents, height detecting means for detecting a document height distribution, correcting means for correcting distortion of a document arising from the document height in accordance with the height distribution of said document, memory means for storing document height distribution data detected by said height detecting means during previous image sensing, and detecting means for detecting whether or not a read document has changed, wherein document distortion is corrected using document height distribution data from previous image sensing when a document has changed.

An eighth object of the present invention is to provide, in an image reading device for reading a thick document such as a book or the like placed on a document platen, an image reader comprising an image sensing means for reading documents, height detecting means for detecting a document height distribution, correcting means for correcting unsharp focus arising from the height of said document in accordance with the height distribution of said document, memory means for storing document height distribution data detected by said height detecting means during previous image sensing, discrimination means for detecting whether or not the document being read has changed, wherein unsharp focus is corrected using document height distribution data from previous image sensing when a document has changed.

A ninth object of the present invention is to provide, in an image reading device for reading a thick document such as a book or the like placed on a document platen, an image reader comprising an image sensing means for reading documents, height detecting means for detecting a document height distribution, correcting means for correcting distortion of a document arising from document height in accordance with the height distribution of said document, memory means for storing document height distribution data detected by said height detecting means during image previous image sensing, and discrimination means for determining whether or not the page of the document being read has been turned, wherein document distortion is corrected using document height distribution data from previous image sensing until the pages of the document being read attain a predetermined value, and then detects the height distribution of the document anew when the page of the document being read attains said predetermined value so as to correct distortion of the document.

A tenth object of the present invention is to provide, in an image reading device for reading a thick document such as a book or the like placed on a document platen, an image reader comprising an image sensing means for reading documents, height detecting means for detecting a document height distribution, correcting means for correcting unsharp focus arising from the height of said document in accordance with the height distribution of said document, memory means for storing document height distribution data detected by said height detecting means during previous image sensing, and discrimination means for determining whether or not the page of the document being read has been turned, wherein unsharp focus is corrected using document height distribution data from previous image sensing until the pages of the document being read attain a predetermined value, and then detects the height distribution of the document anew when the page of the document being read attains said predetermined value so as to correct unsharp focus.

An eleventh object of the present invention is to provide, in an image reading device for reading a thick document such as a book or the like placed on a document platen, an image reader comprising an image sensing means for reading documents, height detecting means for detecting a document height distribution, correcting means for correcting distortion of a document arising from document height in accordance with the height distribution of said document, memory means for storing data for a plurality of document height distributions, and discrimination means for determining whether or not there are abnormalities in the document height distribution data detected during a subsequent reading, and having a selection means for selecting model data nearest the height distribution of a placed document from among said document height distribution model data when an abnormality occurs in the document height distribution, wherein document distortion is corrected using said selected document height distribution model data.

A twelfth object of the present invention is to provide, in an image reading device for reading a thick document such as a book or the like placed on a document platen, an image reader comprising an image sensing means for reading documents, height detecting means for detecting a document height distribution, correcting means for correcting unsharp focus arising from the height of said document in accordance with the height distribution of said document, memory means for storing a plurality of height distribution model data, discrimination means for determining whether or not there are abnormalities in the document height distribution data detected during a subsequent reading, and selection means for selecting model data nearest to the height distribution of a placed document from among said document height distribution model data, wherein unsharp focus is corrected using said selected document height distribution data.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENT

Figure 1:
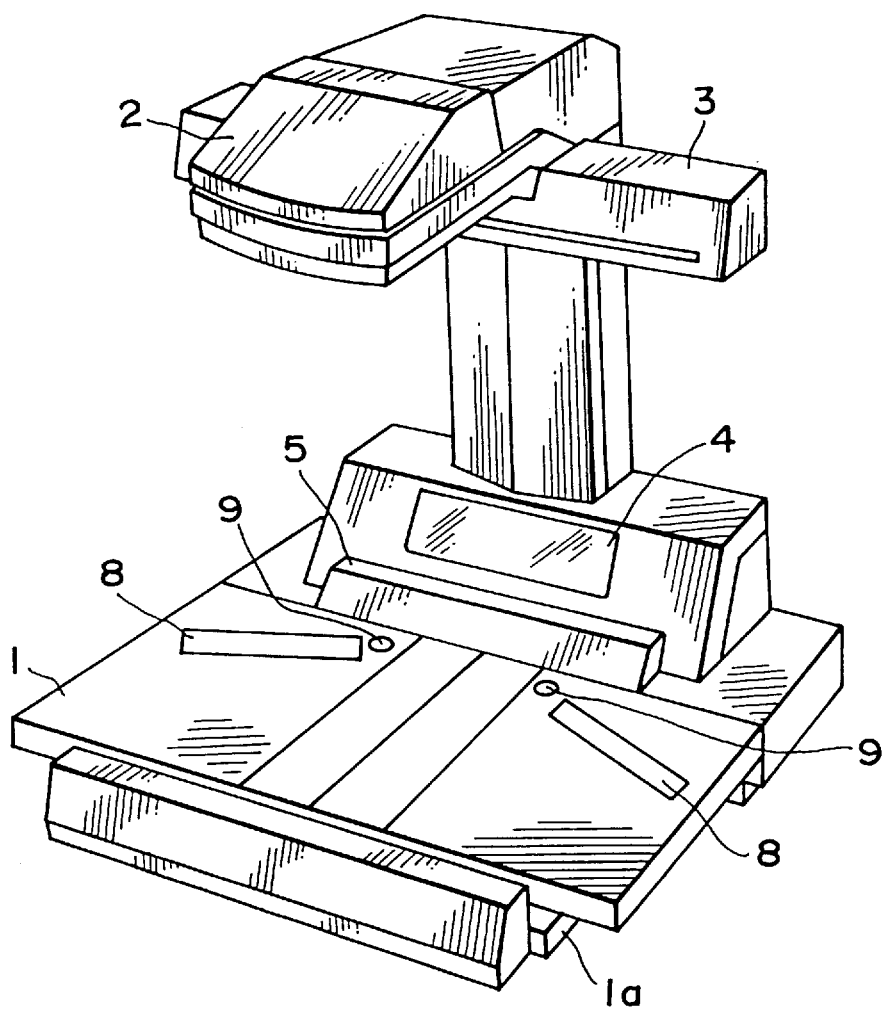
FIG. 1 is a perspective view showing the general construction of the image reader of the present invention.
Figure 2:
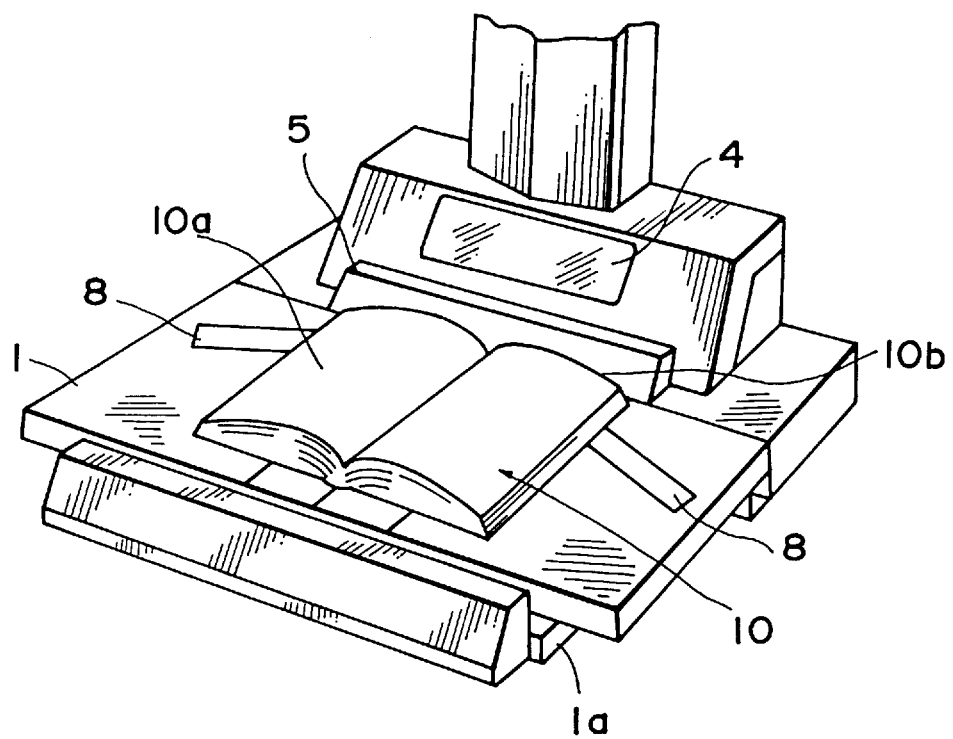
FIG. 2 is an illustration showing the condition of a document positioned on the image reader.

The preferred embodiment of the present invention is described hereinafter with reference to the accompanying drawings. FIG. 1 shows the general construction of the image reader, and FIG. 2 shows the condition of an object document (hereinafter referred to as "book document 10") disposed on document platen 1. Book document 10 is disposed face upward in an open state on document platen 1, and provided there above is an image reader having a line sensor for reading the open-faced surface of book document 10 via optical scanning. The surface of document platen 1 is colored darker than the background color of a typical document, such that the document surface and document platen surface can be distinguished one from another when book document 10 is read with the document platen as a background. The device of the present embodiment is provided with illumination section 3 arranged above document platen 1 on the upper interior side thereof for illuminating book document 10 disposed on document platen 1, control panel 4 for setting various image reading conditions and the like, mirror 5 arranged at an inclination on the interior side of document platen 1 for reflecting the side surface of book document 10, and a control unit (not illustrated) for controlling image reading operations such as the prescan operation and main scan operation of image reader sensing device. Positioning of book document 10 is accomplished by pressing said book document 10 against the bottom edge of mirror 5. Accordingly, the boundary of document platen 1 and mirror 5 is the document reference position. Image data read by image sensing device 2 is subjected to various processing by the control unit, and output to a desired output device (printer, computer or the like). Document platen 1 is provided with start key 8 for starting the reading operation by the device, and document change sensor 9 for detecting a changed document. Document change sensor 9 comprises a photoemitter element and photoreceptor element, wherein light emitted from the photoemitter element is reflected by the back surface of a book document disposed on document platen 1, and impinges the photoreceptor element. Document change detection, i.e., determination of the presence of a document by whether or not light is detected by the photoreceptor element, is accomplished by detecting an interruption of light detection of the photoreceptor element from the previous image sensing until a current image sensing. Start key 8 and document change sensor 9 are provided, one each, on the right and left sides of document platen 1. The document change sensor are not limited to the previously mentioned construction, and constructions wherein a document is interposed between a photoemitter element and a photoreceptor element may also be used. For example, a photoemitter element may be provided on image sensing device 2 at a position at which the light emitted by said photoemitter of document platen 1 impinges a photoreceptor element. In such circumstance, the absence of a document is determined when the photoreceptor element detects light, and the presence of a document is determined when the light impinging said photoreceptor element is interrupted, such that a document is determined to be present when the photoreceptor element does not detect light. Document change detection may also be accomplished using mechanical switches, or using ultrasonic sensors. Document platen 1 rides on document base 1a with independent plates provided on the right side and left side of the document platen so as to be vertically movable.

The reference designation of each part of book document 10 placed on document platen 1 shall be defined now. Open-faced book document 10 is defined as the entire area of pages on both right and left sides, the surface being read by image sensing device 2 is defined as document surface 10a, and the side surface of book document 10 on the interior side of the placed book document is defined as document side surface 10b.

Figure 3:
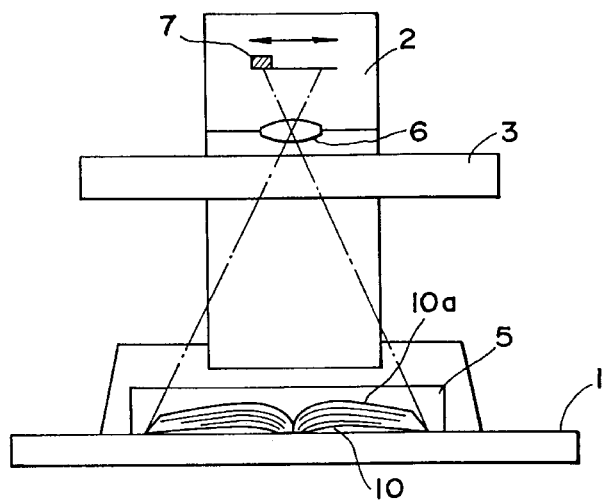
FIG. 3 briefly shows the construction of the image reader viewed from the front.
Figure 4:
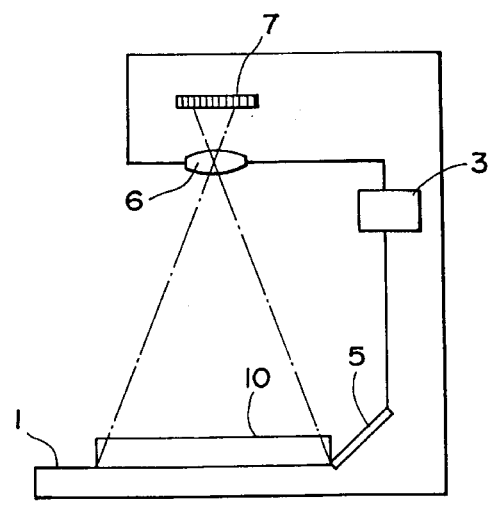
FIG. 4 briefly shows the construction of the image reader viewed from the side.

FIGS. 3 and 4 briefly show the construction of the image reader viewed from the front and side, respectively. Image sensing device 2 is provided with charge-coupled device (CCD) line sensor 7 comprising a plurality of image sensing elements arrayed linearly from the front side of the device to the interior side of the device (main scan direction), and an optical unit having imaging lens 6 for projecting the image of document surface 10a on said line sensor. Line sensor 7 reads the image of document surface 10a by moving in a subscan direction perpendicular to the main scan direction (the direction indicated by the arrow in FIG. 3) at the image forming plane at which the image of document surface 10a is formed. Imaging lens 6 is provided so as to be movable in the direction of the optical axis by a lens driving device (not illustrated) of lens drive unit 30 (refer to FIG. 8), and forms the image of the image of document surface 10a in a normally focused state on line sensor 7 by moving in accordance with the height of book document 10 the height of which is detected in a manner described later. Height detection mirror 5 extends in the subscan direction on the interior side of document platen 1, and is inclined at an angle of 45° relative to the side surface of a document placed on document platen 1, said mirror 5 reflects document side surface 10b of the document placed on document platen 1. Document side surface 10b reflected by mirror 5 is projected by lens 6 together with document surface 10a. Line sensor 7 is provided with a length suitable to read only the projected document surface 10a and document side surface 10b. Line sensor 7 simultaneously reads the images of document surface 10a and the document side surface 10b via scanning movement. Although a line sensor 7 is used in the present embodiment, it is to be noted that an area sensor alternatively may be used.

Book document 10 placed on document platen 1 is disposed face upward in an open condition, such that document surface 10a assumes a spatially curved configuration in a vertical direction. Therefore, the height of book document 10 is detected at various positions in the subscan direction, such that adjustment for distortion of the read image and focus adjustment of the image formed on line sensor 7 are required.

Figure 5:
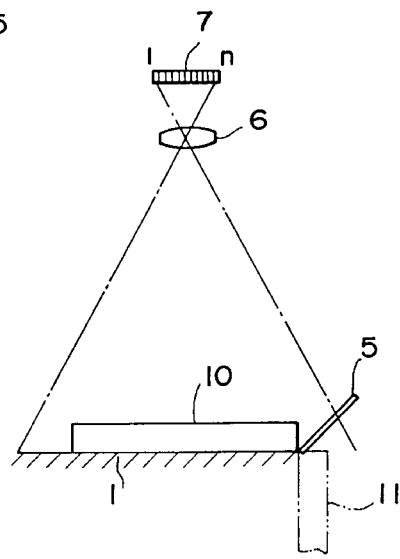
FIG. 5 shows the principle for detecting the height distribution used by the image reader.

FIG. 5 illustrates the principle of the height detection process used in the present embodiment. With book document 10 placed at a predetermined position, image 11 of document side surface 10b is reflected by mirror 5 and read by line sensor 7 to determine the height distribution of book document 10.

Figure 6:
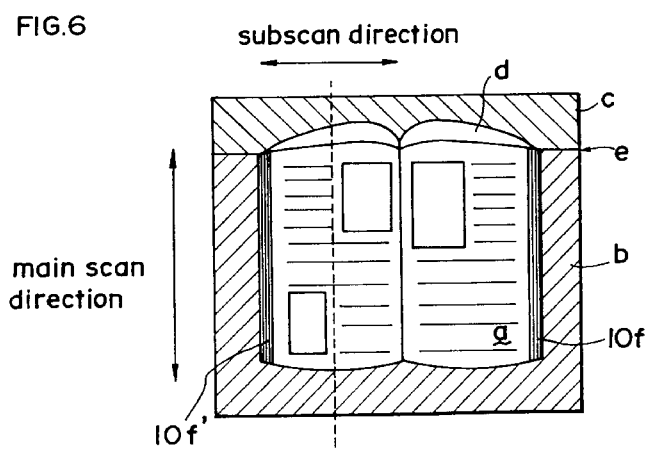
FIG. 6 shows image data read by the image reader.

FIG. 6 shows the condition of image data read by image sensing device 2 having the previously described construction. In the drawing, reference item a refers to the image the of document surface 10a, reference item b refers to the image of document platen 1, reference item c refers to the image of the background of reflected in mirror 5, reference item d refers to the image of the side surface 10b of book document 10 reflected by mirror 5, and reference item e refers to the document positioning reference. Document surface image 1 and document side surface image d are read in a curve in the main scan direction by changing the height of the document. The document surface and document side surface are read as white since white is near the typical color of the paper. In contrast, document platen 1 and image c of the background reflected by mirror 5 are colored darker than the document background so as to produce less reflected light, and are read a black.

Figure 7:
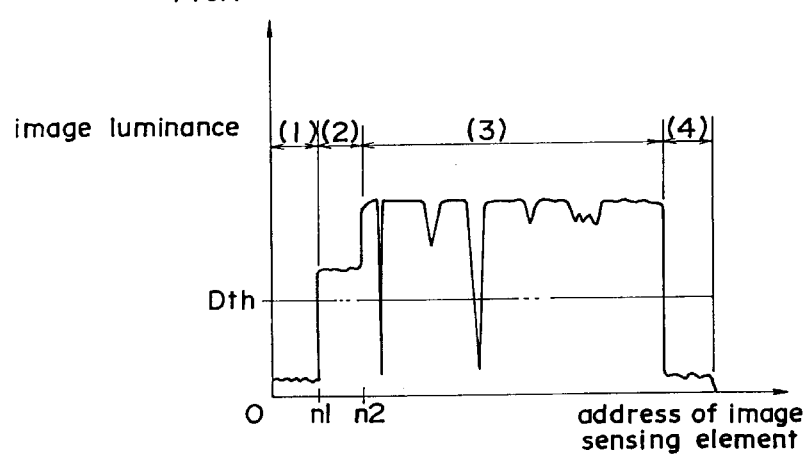
FIG. 7 shows an example of one-line output in the main scan direction via a CCD line sensor.

FIG. 7 shows the condition of one-line output in the main scan direction read by line sensor 7. This example pertains to reading of the image by line sensor 7 at the position indicated by the dashed line in FIG. 6. The output (i.e., density of the image) of each picture element on the vertical axis at the address of the imaging element of line sensor 7 on the horizontal axis is output. In the drawing, reference number (1) refers to image c of the background area reflected on mirror 5, reference number (2) refers to image d of the document side surface reflected on mirror 5, reference number (3) refers to image a of document surface 10*a*, and reference number (4) refers to the region on the imaging element of each picture element of image b of document platen 1. Reference item Dth refers to a predetermined threshold value for determining whether or not an image is an image of a document or another image. Reference item n1 refers to the minimum address value of the imaging element output which exceeds the threshold value Dth, i.e., a value expressing the position at the top edge of image 11 of document side surface 10*b*. Reference item n2 refers to the address value of the imaging element corresponding to the document positioning reference, and is a fixed value. (N2−n1) is the number of picture elements corresponding to the document height used in the height detection process. Document height distribution data (refer to FIG. 12) are determined from the (n2−n1) value of each line. The aforesaid height distribution data are used to calculate the image distortion correction coefficient to correct image distortion caused by changes in document height, and calculate autofocus (AF) control data to move imaging lens 6 in vertical directions so as to eliminate defocusing caused by changes in document height.

Figure 8:
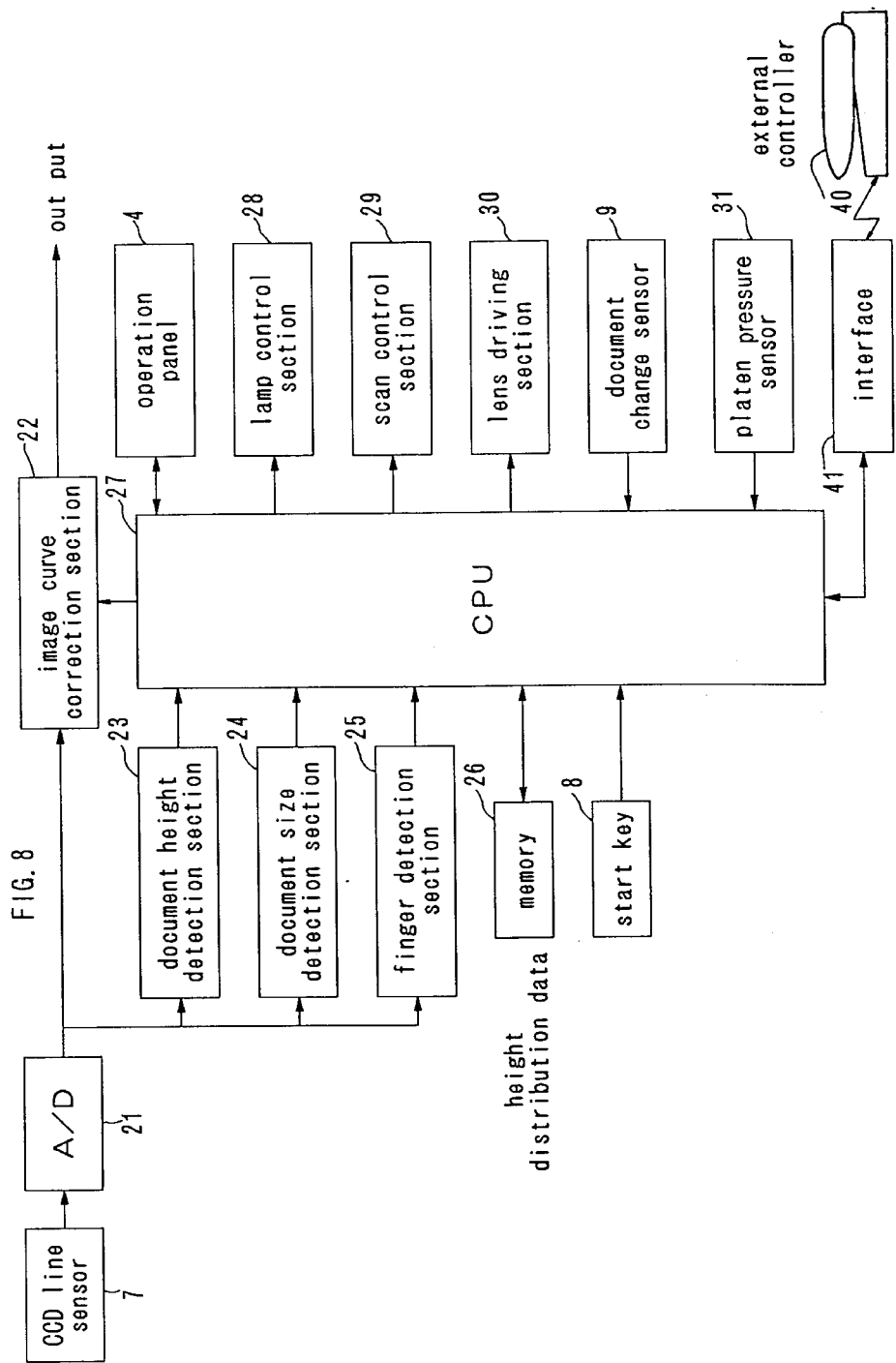
FIG. 8 is a block diagram of the circuitry of the image reader.

FIG. 8 is a block diagram of circuitry of the image reader. Image data read by CCD line sensor 7 are converted to digital data by analog-to-digital (A/D) converter 21. During prescanning, the aforesaid output is transmitted to document height detection section 23 for detecting document height, document size detection section 24 for detecting the actual size of a document from the distorted read image, and finger detection section 25 for erasing images of fingers which may intrude when pressing a page of the document. During the main scan, the aforesaid data pass through image curve correction section 22 and are output. CPU 27 controls the entire image reader. CPU 27 calculates the document height distribution from the output of document height detection section 23, calculates the document size from the output of document size detection section 24, and calculates the position of hands and fingers holding the document from the output of finger detection section 25. The calculated document height distribution is used to calculate defocusing generated by changes in document height, and AF control data and image distortion correction coefficient are calculated to correct the distortion of the document image, and said calculation results are respectively stored in memory 26. Memory 26 also stores the aforesaid height distribution data. CPU 27 accomplishes other types of calculations, including ON-edge detection of start key 8, control for display switching of operation panel 4, ON/OFF control of lamp 3 through lamp control section 28, movement control of CCD line sensor 7 in the subscan direction through scan control section 29, control of image distortion correction through output of correction coefficient to image distortion correction section 22, recognition of document change from the output of document change sensor 9, and calculation of the amount of change in the number of document pages from the output of document platen pressure sensor 31 (refer to FIG. 9). The document change detection means, document change discrimination means, and image distortion correction means of the present invention comprise CPU 27 and programs executed by said CPU 27.

Height distribution data of the previous reading is stored in memory 26 in addition to the height distribution data of the most recent reading. Interface 41 is connected to CPU 27 for communicating with external controller 40, such that CPU 27 can receive various types of control commands and information from external controller 40 through interface 41, and operating conditions and the like can be transmitted from CPU 27 to external controller 40 through interface 41. Interface 41 is capable of bidirectional communications, and as such may also be used for parallel communications, or connected to a local area network (LAN) such as Ethernet in addition to serial communications such as RS422.

Figure 9:
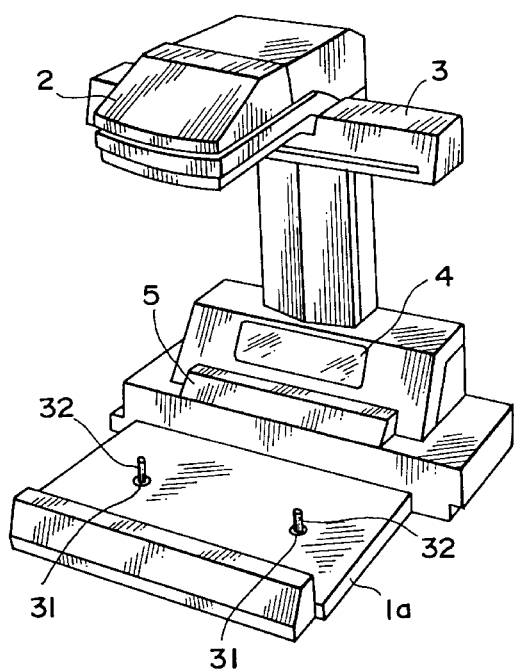
FIG. 9 shows document platen 1 pulled out from the image reader.

FIG. 9 shows document platen 1 pulled out from the image reader shown in FIG. 1. In the drawing, support rod 32 is provided to support document platen 1 on base 1*a*, and platen pressure sensor 31 is provided to measure the pressure on base 1*a* from support rod 32. Document platen 1 riding on support rods 32 comprises a right and left plate, and the pressure on each plate is measured by platen pressure sensors 31. The weight of a document is higher in accordance with a greater number of pages of said document placed on the plates, and the pressure on the plates is also increased. Accordingly, the number of pages of the document disposed on each plate can be determined from the pressure exerted on base 1*a* by each right and left plate. CPU 27 checks sensor 31 when a previous imaging ends and a subsequent imaging starts (when start key 8 is ON) so as to detect the amount of change in the number of pages of the document on each right and left plate.

Figure 10:
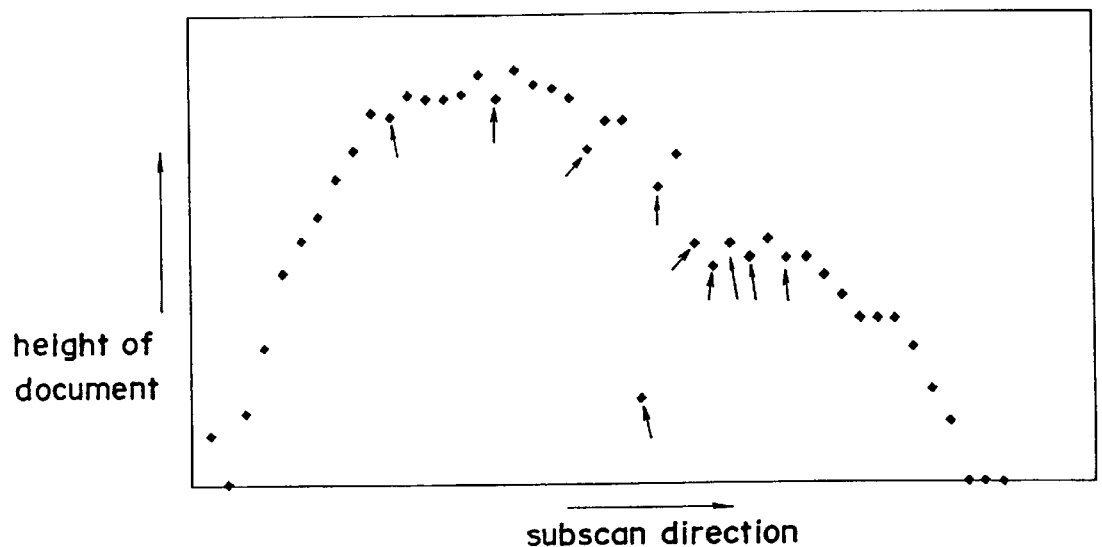
FIG. 10 shows the condition of height distribution data correction.
Figure 11:
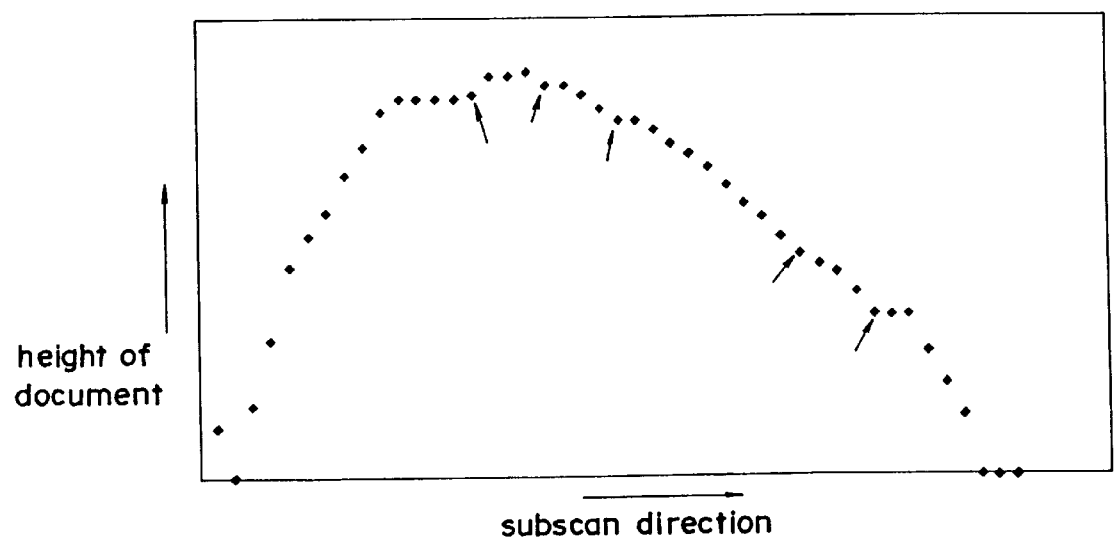
FIG. 11 shows the condition of height distribution data correction.
Figure 12:
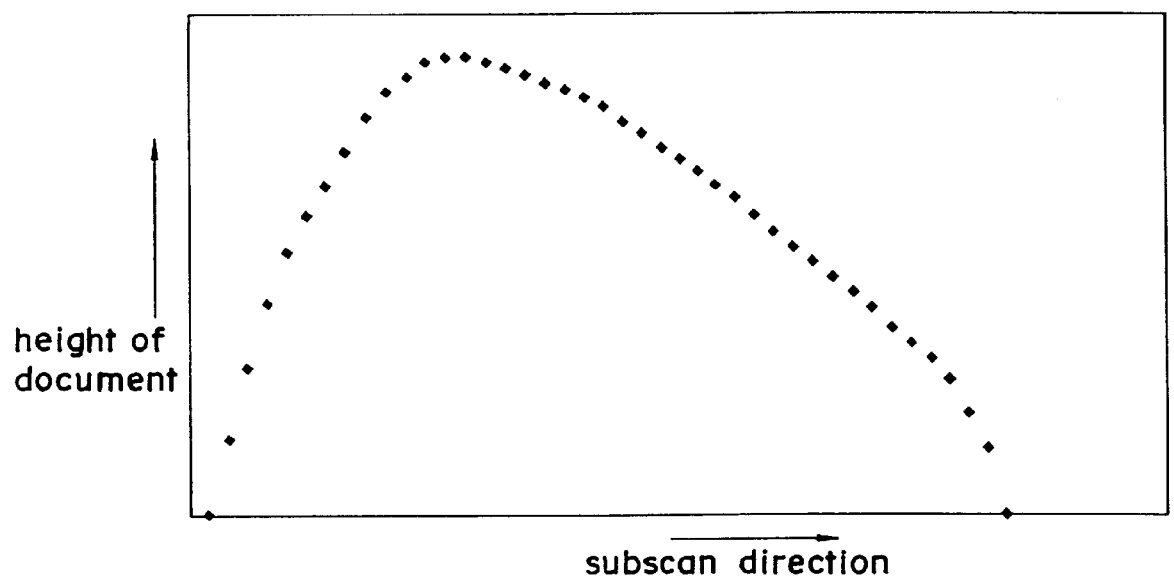
FIG. 12 shows the condition of height distribution data correction.

FIGS. 10, 11 and 12 show the condition of height distribution data correction. FIG. 10 shows the height distribution data obtained by document height detection section 23 for a book plotted as height values on the vertical axis with the subscan direction on the horizontal axis. Since this document is a book, the height distribution is a smooth curve, although some noise appears in the height distribution data in FIG. 10 due to soiling at the upper edge of the document, or duplication of an object outside the document on mirror 5. The noise data in FIG. 10 are indicated by arrows. Noise detection is accomplished by designating as noise any data which deviates above a predetermined value among data from a line formed by two points on the outside of any three-point consecutive data. The results of correcting the noise of FIG. 10 are shown in FIG. 11. Although the height distribution data are smoothed at the present stage, some noise elements remain as in FIG. 10 which are uncorrectable, such that a truly smooth curve is not obtained. Therefore, the height distribution data of FIG. 11 cannot be used for AF control or image distortion correction.

The determination as to whether or not the height distribution data of FIG. 11 is accomplished by counting the number of points in the curve in the reverse direction to the curve direction, and designating inadequate correction when a predetermined value is exceeded. Specifically, the points indicated by arrows in FIG. 11 curve in a reverse direction, and the number of said points is used to determine whether or not the height distribution data are smooth. If the height distribution data are not smooth, said data are designated abnormal. On the other hand, FIG. 12 shows height distribution data during a previous reading, and these data form a smooth curve. If the document has not changed from the previous reading to the current reading and change in the number of document pages is slight, the document height distributions for the previous reading and the current reading may be deemed nearly identical. When the document has not been changed from the previous reading to the current reading and the change in the number of document pages is slight, the height distribution data of FIG. 11 may be corrected by substituting all of the previous height data for the current height data, or substituting only the uncorrectable data.

Figure 13:
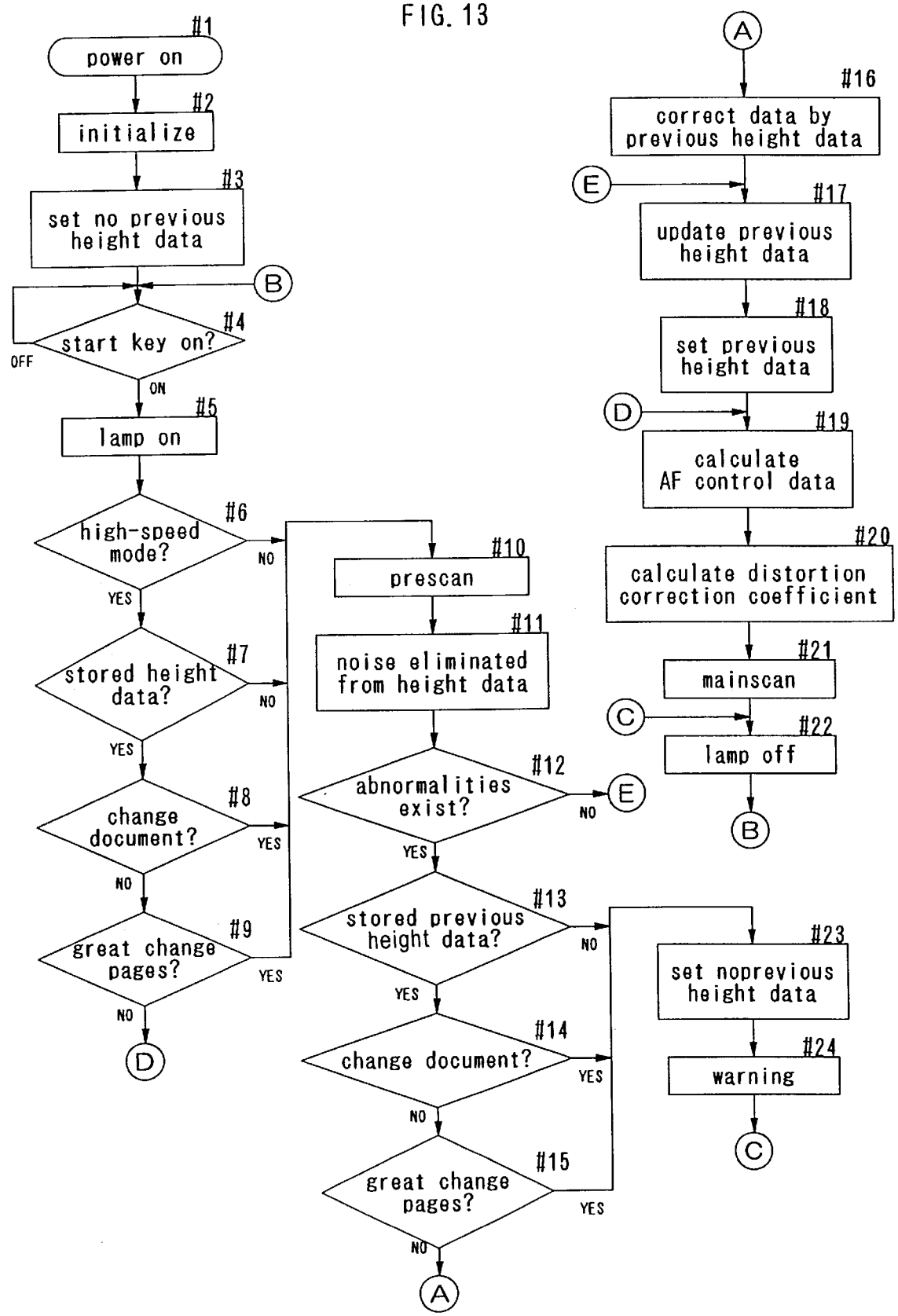
FIG. 13 is a flow chart showing the CPU processing sequence during image sensing by the image reader.

FIG. 13 is a flow chart showing the processing sequence of CPU 27 during reading by the image reader having the previously described construction. When the power source of the image reader is turned ON (#1), the image reader is initialized (#2), and the "no previous height data" flag is set (#3). This flag is set at [1] when height distribution data are stored in memory 26 within the image reader, and is set at [0] when no height distribution data are stored in memory 26. Then, the image reader is at standby until start key 8 is switched ON (#4). When start key 8 is turned ON, lamp 3 is turned ON to start the copy operation (#5). After each type of determination has been made, a normal prescan (#10) is accomplished, or the process advances to step #19. The various types of determinations include checking whether or not the high-speed mode is selected (#6). When the high-speed mode is not selected (#6: NO), the prescan operation is executed (#10). When the high-speed mode has been selected (#6: YES), a check is made to determine whether or not height distribution data from a previous reading are stored in memory 26 (#7), and is said height distribution data are not stored in memory 26 (#7: NO), the prescan operation is executed (#10). If height distribution data are stored in memory 26 (#7: YES), a determination is made as to whether or not the document has changed by checking the output of document change sensor 9 (#8). If the document has changed (#8: YES), a prescan is executed (#10), whereas if the document has not changed (#8: NO), a determination is made as to whether or not there has been a great change in the number of document pages by checking the output of platen pressure sensors 31 (#9). When the amount of change in the number of document pages exceeds a predetermined value (#9: YES), a prescan is executed (#10). When said amount of change in the number of document pages does not exceed said predetermined value (#9: NO), the routine advances to steps #19 and subsequent steps, AF control data are calculated using height distribution data of a previous reading (#19), and a curve correction coefficient is calculated to correct distortion arising from document height (#20), and a main scan is executed (#21).

The high-speed scan mode is accomplished when height distribution data is stored in memory 26 within the image reader, by accomplishing AF control and image distortion correction using said height distribution data stored in memory 26 without generating new height distribution data. Prescanning is omitted to achieve high-speed image reading.

Even if height distribution data are stored in memory 26, prescanning is executed to update height distribution data when a document is replaced, a large number of pages have been turned, or height distribution data differs from that stored in memory.

When the prescan operation of step #10 is completed, noise is eliminated from the height distribution data detected as shown in FIGS. 10 and 11 (#11). Thereafter, the data of step #11 is checked to determine whether or not abnormalities exist as shown in FIG. 12 (#12). If no abnormalities exist in the height distribution data (#12: NO), the routine advances to step #17, and the previous height distribution data is updated by the height distribution data of the current scan. If abnormalities do exist in the height distribution data (#12: YES), a check is made to determine whether or not previous height distribution data are stored in memory 26 (#13). If previous height distribution data are stored in memory 26 (#13: YES), a determination is made as to whether or not the document has changed by checking the output of document change sensor 9 (#14). When the document has not been changed (#14: NO), a determination is made as to whether or not the number of document pages has changed greatly by checking platen pressure sensor 31 (#15). If the amount of change of the page numbers does not exceed a predetermined value (#15: NO), the uncorrectable data are corrected using the previous height distribution data (#16). Thereafter, the previous height distribution data stored in memory 26 is updated by the height distribution data obtained in the prescan of step #10 (#17), and the "previous height distribution data present" flag is set (#18). AF control data (#19) and distortion correction coefficient (#20) are calculated based on the obtained height distribution data, and the main scan is executed (#21). When the main scan is completed, lamp 3 is turned OFF (#22), the routine returns to step #4), and the start key is checked again.

When previous height distribution data are not present in step #13 (#13: NO), the document has changed in step #14 (#14: YES), or the number of document pages has changed greatly in step #15 (#15: YES), the "no previous height data" flag is set (#23) because previous height distribution data cannot be used, a warning is displayed on the operation panel and an audible warning is generated (#24), and the routine moves to step #22 without executing a main scan.

When the previously read document and the current document have not been changed, or when there is only slight change in the number of document pages, consideration may be given to moving the document horizontally in the subscan direction when the document size detection result in the subscan direction differ from a previous result. In such a circumstance, the amount of horizontal movement may be considered when correcting height distribution data using previous height distribution data. Although a document change is detected by a sensor in the present embodiment, an operator may specify a document change (or lack thereof) via operation panel 4, insofar as the device can recognize whether or not a document change has occurred. When an automatic page turning device is used, document change and the amount of turned pages can be readily and accurately obtained. That is, the amount of turned pages can be detected and a determination made via the magnitude of the turned page value as to whether or not to achieve correction using previous data, such that previous data may be used to achieve greater precision in said determination and improve correction reliability.

Figure 14:
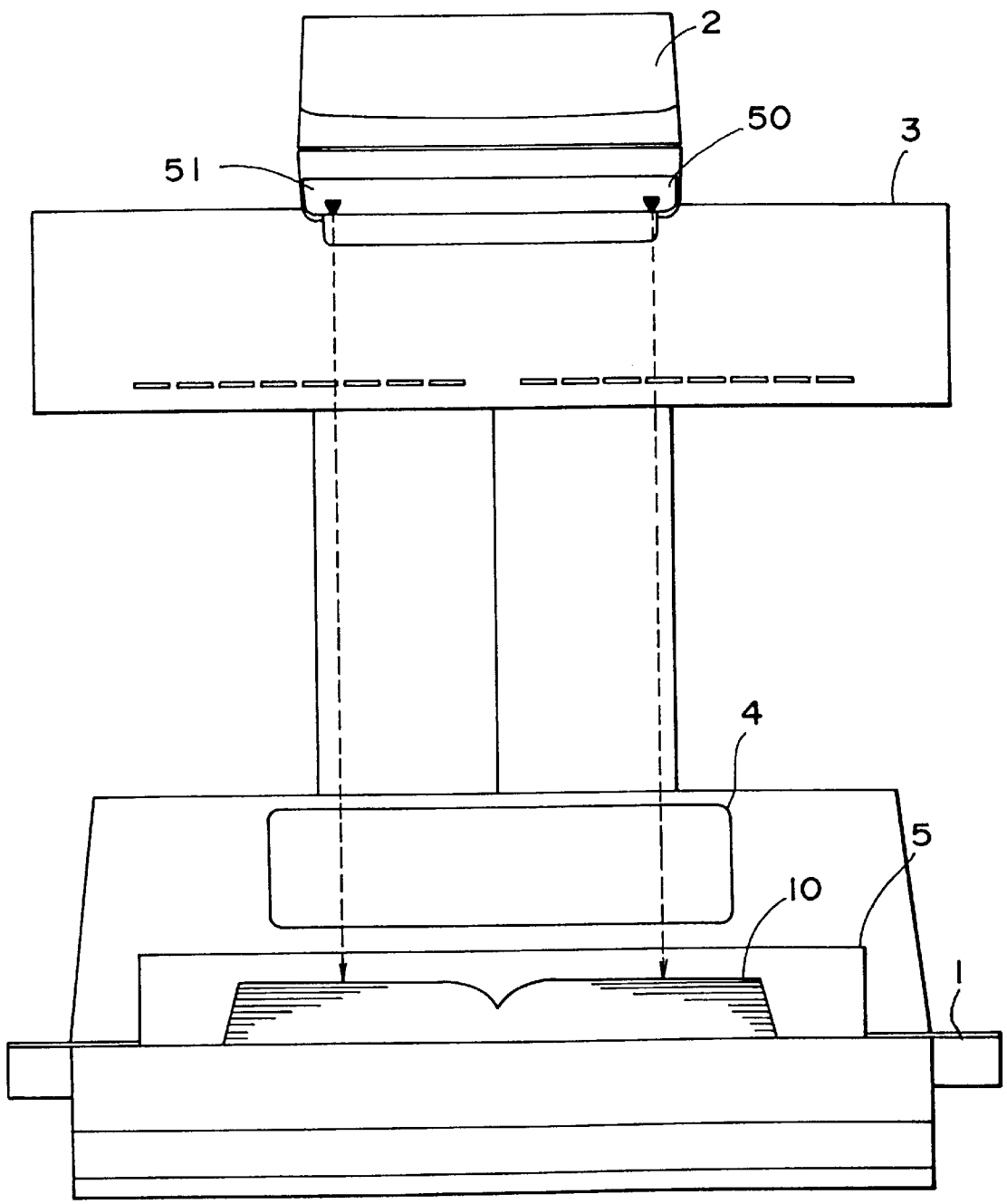
FIG. 14 is a front view of the image reader.
Figure 15:
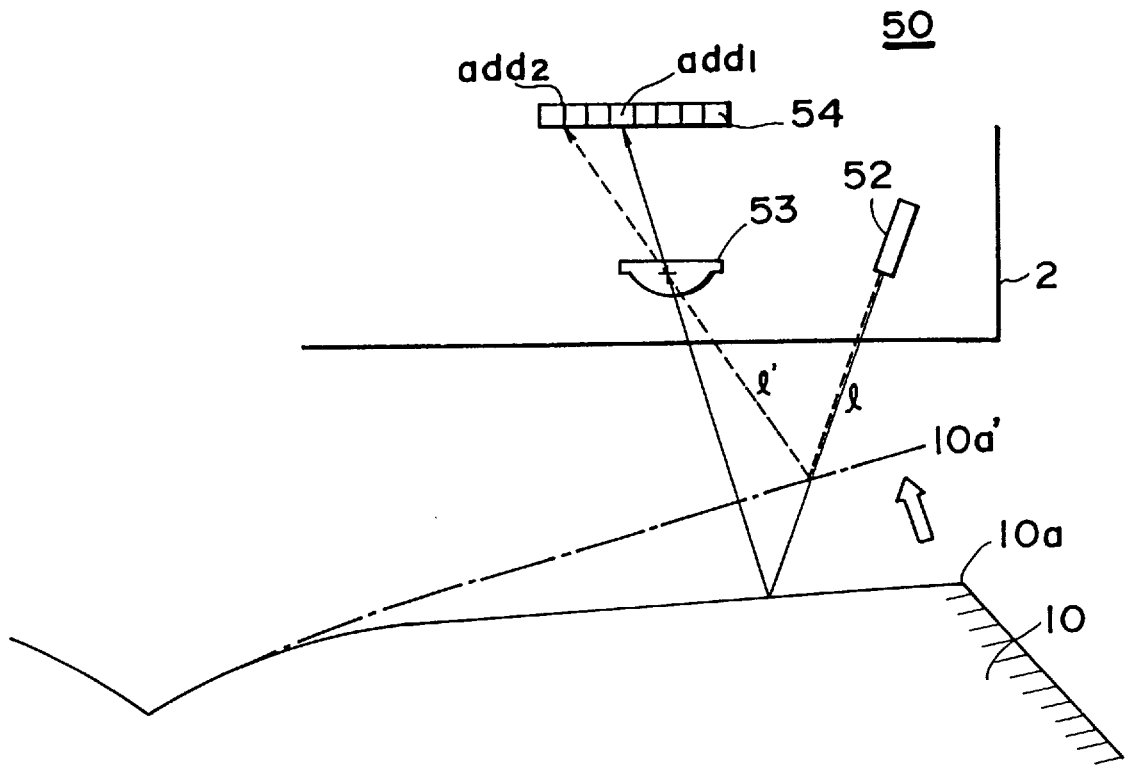
FIG. 15 illustrates the page turning detection method.
Figure 16:
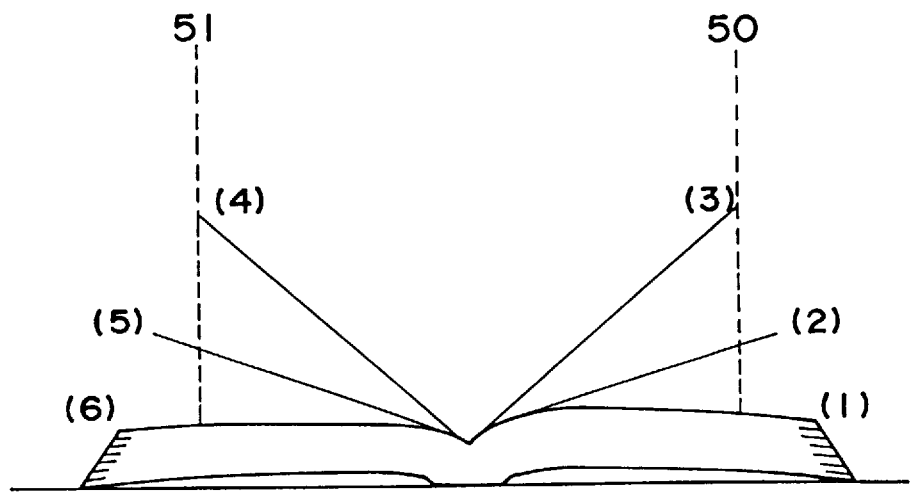
FIG. 16 shows the pages of a book document being turned.
Figure 17A:
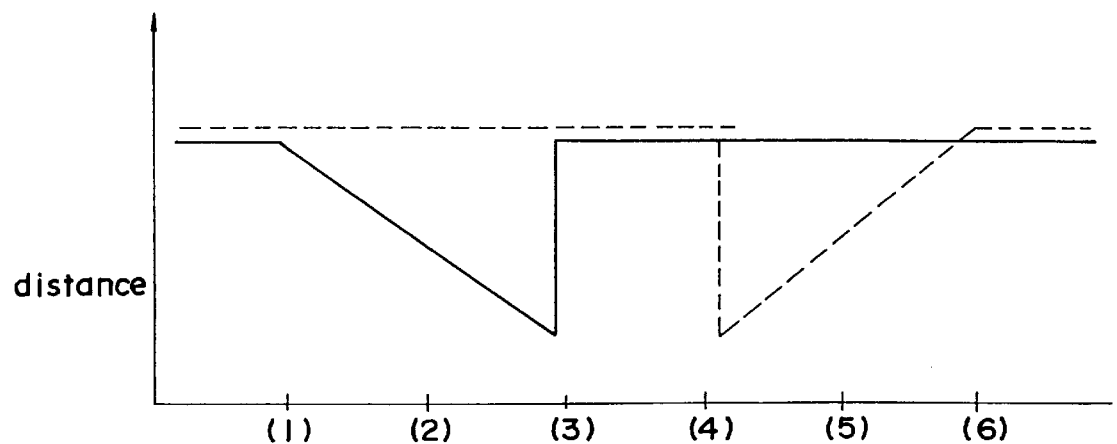
FIGS. 17*a* and 17*b* show the output of page turn sensors 50 and 51.

In the present embodiment, a determination is made as to whether or not a great change has occurred in the number of pages by checking platen pressure sensor 31. It is to be noted, however, that height distribution data can be updated when a predetermined number of pages have been turned by recognizing the change in the number of pages by counting the number of document pages turned from right to left or from left to right. The aforesaid methods are used in FIGS. 14, 15, 16, 17a and 17b. FIG. 14 is a front view of an image reader. Page turn sensors 50 and 51 are provided at positions corresponding to the left and right side pages of book document 10 placed on document platen 1 in image sensing device 2. Page turn sensors 50 and 51 measure the distance between document surface 10a of document 10 and the page turn sensors 50 and 51. The measurement method is described in FIG. 15, which shows the condition of distance measurement for the page on the right side. The construction of the page turn sensor 50 is enlarged and the distance between document surface 10a and image sensing device 2 is shortened to facilitate understanding of the measurement principle. Distance measurement relative to the page on the left side is identical to that for the page on the right side and further description is therefore omitted. Page turn sensor 50 comprises photoemitter element 52, lens 53, and line sensor 54 (identical to the construction of sensor 51). The optical path of photoemitter element 52 illuminating document surface 10a in a stationary page state is designated, and indicated by a solid line. The nonstationary stage of document surface 10a' during page turning is indicated by a thick dashed line, and the optical path of photoemitter element 52 illuminating document surface 10a' in said nonstationary state is designated, and is indicated by the thin dashed line. Light emitted from photoemitter element 52 and reflected by document surface 10a in a stationary state impinges add1 of line sensor 54. Light reflected by document surface 10a' in a nonstationary state impinges add2 of line sensor 54. Thus, if the distance between the document surface and page turn sensor 50 is long, the light emitted from photoemitter 52 impinges the right side of line sensor 54, whereas if the distance is short, the light impinges the left side of line sensor 54. (The left and right sides are reversed in the case of sensor 51.) Accordingly, the distance between the document surface and page turn sensor 50 can be determined by the position of the light impinging line sensor 54. FIG. 16 illustrates the condition of turning the pages of book document 10. The sequence order (1)–(2)–(3)–(4)–(5)–(6) occurs when the pages of book document 10 are turned from right to left, and the sequence order (6)–(5)–(4)–(3)–(2)–(1) occurs when the pages are turned left to right. FIG. 17a shows the output of page turn sensors 50 and 51 when the pages of book document 10 are turned from right to left. The solid line described the output of page turn sensor 50 for the right side page, and the dashed line described the output of sensor 51 for the left side page. The output substitutes the position of the light impinging line sensor 54 for the distance from the document surface to the sensor. A displacement occurs from state (1) to (2) as the page of document surface 10a is turned, such that the distance between the document surface and page turn sensor 50 is shortened, and the output of page turn sensor 50 becomes gradually smaller. In state (3), the light heretofore emitted from photoemitter element 52 and reflected by the turning page for distance detection now falls past said turning page and is reflected by the next lower page, such that a sudden increase of output value occurs. (The distance between page turn sensor 50 and the page surface increases.) Between states (3) and (4), there is no change in output of either page turn sensors 50 or 51. When the turned page attains state (4), left page sensor 51 which heretofore has detected the distance to the lower page via the light emitted from photoemitter element 52 and reflected from said page, now detects light reflected by the turning page, such that a sudden decrease of sensor 51 output value occurs. The displacement in the state change from (4) to (5) causes the distance between the document surface and sensor 51 to lengthen, and the output value of left sensor 51 increases. Page turning ends when state (6) is attained, and there is no change in the output of either page turn sensor 50 or 51.

Figure 17B:
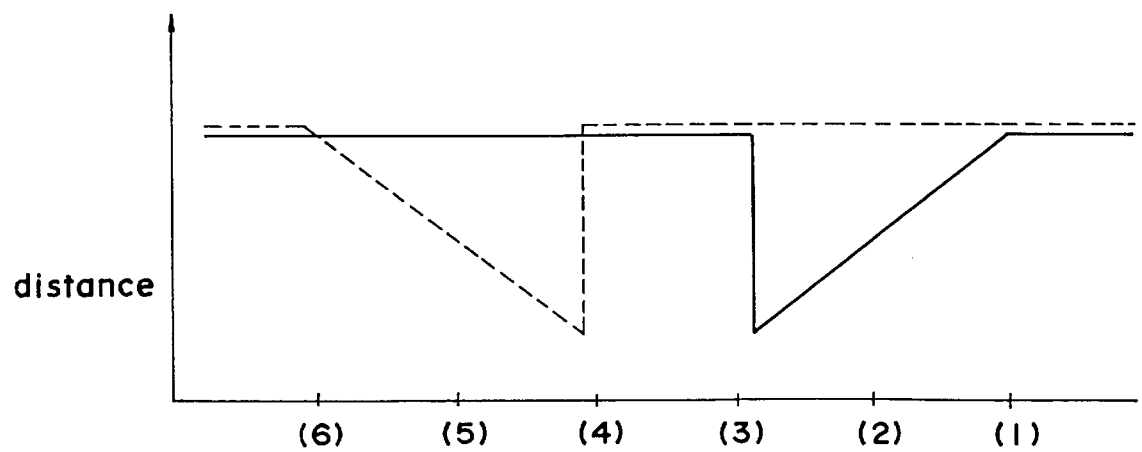

FIG. 17b shows the output of page turn sensors 50 and 51 when the pages of book document 10 are turned from left to right. The output of right side page turn sensor 50 is indicated by the solid line, and the output of left side sensor 51 is indicated by the dashed line. A displacement occurs from state (6) to (5) as the page of document surface 10a is turned, such that the distance between the document surface and page turn sensor 50 is shortened, and the output of sensor 51 becomes gradually smaller. In state (4), the light heretofore emitted from photoemitter element 52 and reflected by the turning page for distance detection now falls past said turning page and is reflected by the next lower page, such that a sudden increase of output value occurs. (The distance between sensor 51 and the page surface increases.) Between states (4) and (3), there is no change in output of either page turn sensors 50 or 51. When the turned page attains state (3), right page turn sensor 50 which heretofore has detected the distance to the lower page via the light emitted from photoemitter element 52 and reflected from said page, now detects light reflected by the turning page, such that a sudden decrease of page turn sensor 50 output value occurs. The displacement in the state change from (3) to (2) causes the distance between the document surface and page turn sensor 50 to lengthen, and the output value of right page turn sensor 50 increases. Page turning ends when state (1) is attained, and there is no change in the output of either page turn sensor 50 or 51. The page turn count is incremented +1 when the change in output of page turn sensors 50 and 51 occurs first in page turn sensor 50 followed by the change in sensor 51 output, and the count is decremented −1 when the change occurs first in sensor 51 output followed by a change in page turn sensor 50 output. That is, the count is incremented +1 when turning right to left, and decremented −1 when turning left to right. The amount of change of all pages is an absolute value satisfying the aforesaid count values. The amount of change of all pages determined by this method can be substituted as the amount of change of pages detected by the method previously described using the platen pressure sensor 31 (FIG. 13, steps #9 and #15). If the aforesaid methods are used jointly, a large amount of change can be detected by the method using platen pressure sensor 31 when a plurality of pages are turned at once, and the amount of change can be detected by page turn sensors 50 and 51 when one page at a time is turned and the change the output of pressure sensor 31 is gradual and incremental.

Figure 18:
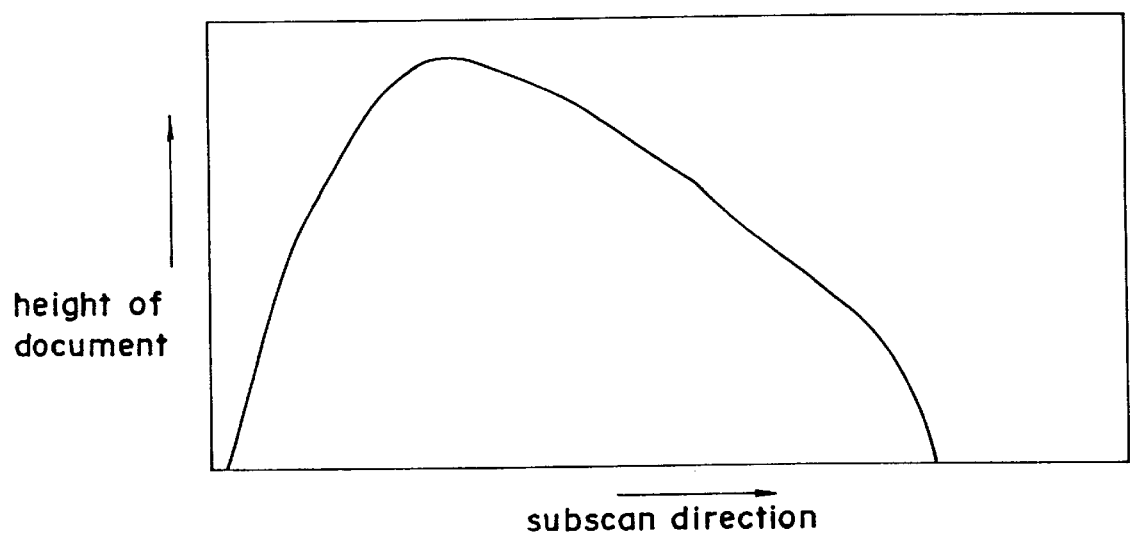
FIG. 18 shows height distribution model data.

Another embodiment of the present invention is described hereinafter. When documents are restricted to books, the height distribution can be of various types depending on the size, thickness and binding of the book. A number of typical models of book height distributions are stored in memory beforehand, and a pattern matching process is executed using said stored models and actually detected height distribution data, wherein the model most similar to the data is used as the height distribution data. For example, in the case of height distribution data such as shown in FIG. 10, the height distribution data model shown in FIG. 18 is most similar. Pattern matching is accomplished by selecting the pattern having the minimum sum of the absolute values of the differences between each point of actually detected height distribution data and each point of height a distribution model at a subscan position corresponding to said actual data points. When the sum of the aforesaid absolute values of all height distribution models exceeds a predetermined value, it is determined that a suitable distribution model is not available. In such instances, various other methods used in image processing and signal processing may be used. If the document height distribution is considered in terms of a general shape relative to the size of the document, a plurality of model can be created by enlarging or reducing a model of a single size, thereby conserving memory.

Figure 19:
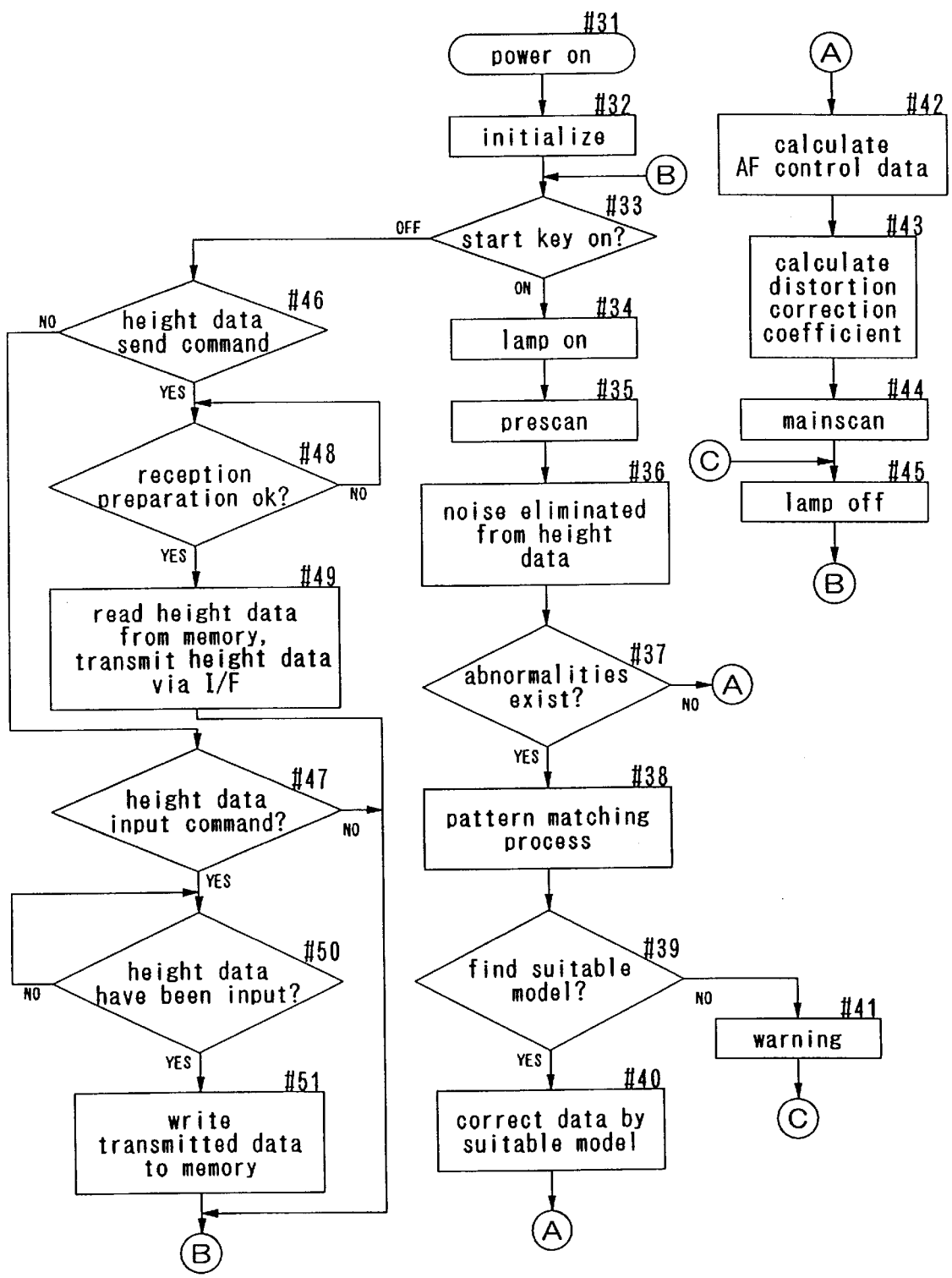
FIG. 19 is a flow chart showing another example of the CPU processing sequence during image reading.
Figure 20:
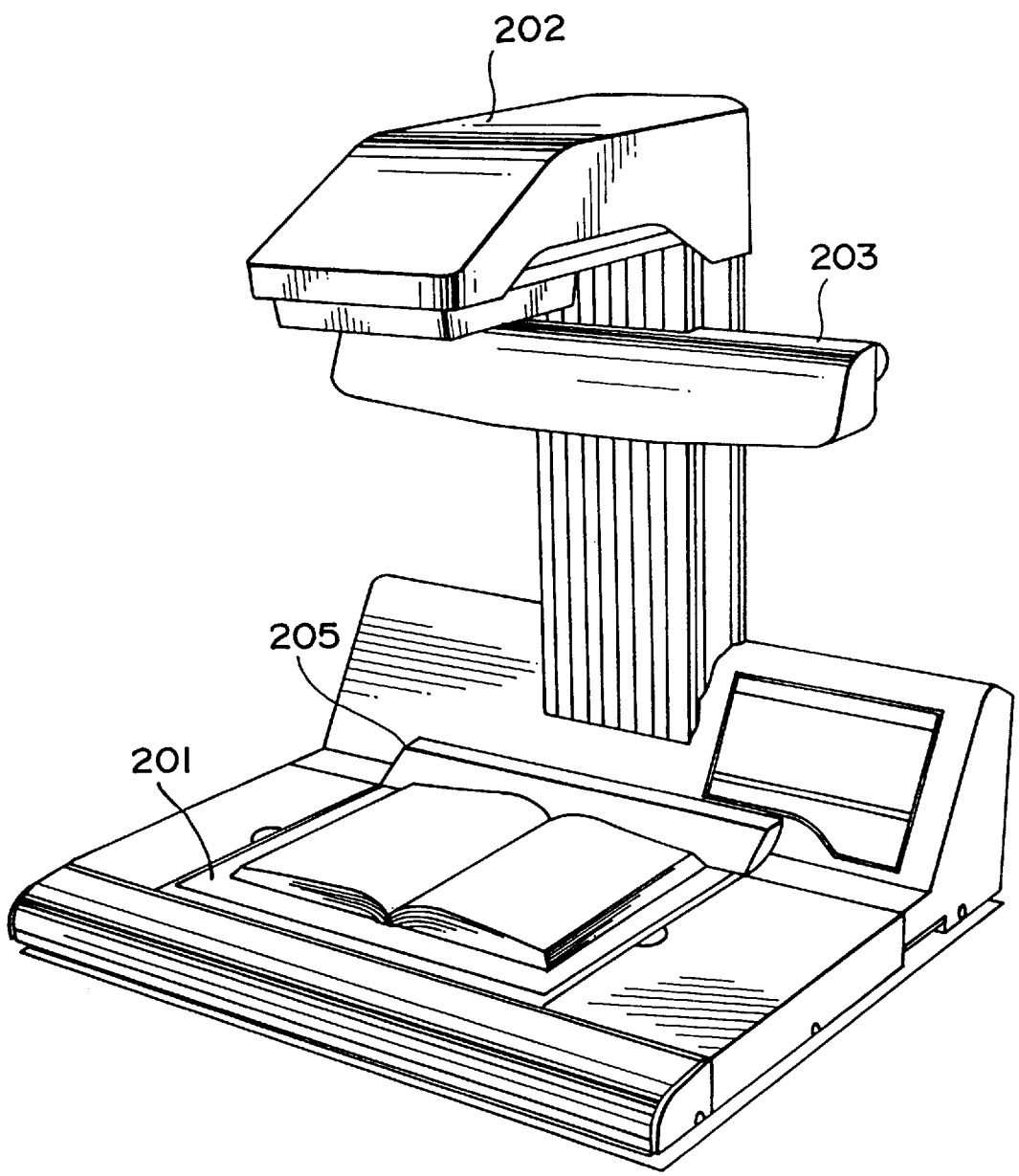
FIG. 20 is shows a conventional image reader.

FIG. 19 is a flow chart showing another example of the process sequence of CPU 27 during reading. When the power source is turned ON (#31), the device is initialized (#32). Then the device remains at standby until the start key 8 is turned ON (#33). When the start key 8 is turned ON, the lamp is turned ON (#34), prescanning is executed (#35). When prescanning is completed, noise is eliminated from the detected height distribution data as shown in FIGS. 10 and 11 (#36). Thereafter, a check is made to determine whether or not the height distribution data are abnormal as shown in FIG. 12 (#37). If there are no abnormal height distribution data (#37: NO), the routine continues to step #42 and subsequent steps. If, however, there are abnormal height distribution data (#37: YES), the pattern matching process is executed to match the detected data with height distribution models stored in memory 26 (#38). When the sum of the absolute values of the differences between each point of actually detected height distribution data and each point of height a distribution model at a subscan position corresponding to said actual data points is less than a predetermined value, the pattern having the lowest such sum is selected (#39: YES), and that model is used for the height distribution data (#40). Then, the AF control data (#42) and distortion correction coefficient (#43) are calculated based on said obtained height distribution data, and the main scan is executed (#44). When the main scan is completed, lamp 3 is turned OFF (#45), the routine returns to step #33, and the start key 8 is checked again. On the other hand, when there is no model wherein the sum of the absolute value of the difference between each point of actually detected height distribution data of step #39 and each point of height a distribution model at a subscan position corresponding to said actual data points is below a predetermined value (#39: NO), a warning display appears on operation panel 4 and an audible alarm is generated because the height distribution data cannot be corrected (#41), and the routine continues to step #45 without executing a main scan.

In step #33 the pressing of the start key is awaited, and at this time CPU 27 awaits command input from external controller 40 via interface 41. That is, a check is made to determine whether or not height distribution data commands (height distribution data send commands) have been transmitted from external controller 40 (#46). When the aforesaid commands are not transmitted (#46: NO), a check is made to determine whether or not commands to transmit height distribution data to the reading device have been sent by external controller 40 (height distribution data input commands) (#47). If said commands have not been transmitted (#47: NO), the routine returns to step #33. If the height distribution data send command has been transmitted in step #46 (#46: YES), a check is made to determine whether or not external controller 40 has completed reception preparation (#48), and if said preparation has been completed, CPU 27 reads height distribution data from memory 26, and transmits said data through interface 41 to external controller 40 (#49). When data transmission is completed, the routine returns to step #33, and the start key and commands are monitored again. If the height distribution data input command is transmitted in step #47 (#47: YES), a check is made to determine whether or not height distribution data have been input (#50), and if data have been transmitted, said transmitted data are sequentially written to memory 26 (#51). When the aforesaid input is entirely completed, the routine returns to step #33, and the start key and commands are monitored again.

When CPU 27 receives commands to transfer the aforesaid transmitted height distribution data from external controller 40 through interface 41 using the aforesaid command monitoring process, subsequently transmitted distribution data are written to memory 26 as current distribution data, and said written distribution data can be used for height distribution data correction. When CPU 27 receives a command to transfer distribution data from external controller 40 through interface 41, the specified distribution data are read from memory 26, and transmitted through interface 41 to external controller 40.

The actually detected height distribution data and document height distribution models stored in memory 26 are compared, and the data is substituted in the distribution model in accordance with the comparison result. When using this distribution model data until the document is changed, prescanning to obtain height distribution data can be omitted, and the copy cycle time reduced insofar as the shape of the read document remains constant or virtually unchanged.

More distribution models can be stored in external controller 40 without increasing the storage capacity of memory 26 by providing a function for outputting stored distribution models to external controller 40, or a function for storing distribution data input from external controller 40 in memory 26. Height distribution models may be used jointly when a plurality of image readers are connected to external controller 40. Higher precision distribution models may be stored in the reading device by the user.

The present invention is not limited to the previously described embodiments and may be variously modified. For example, the previously described two correction methods may be used in combination. That is, when "no previous height data" occurs in a first method, a second method may be used for correction, or after correction by a first method, a second method may be used for correction. In each of the examples, distribution data noise was eliminated, and thereafter previous data or model data were used for correction, but it is to be noted that previous data or model data may be used for correction without eliminating noise from the distribution data. Although a mirror was used to measure document height distribution in the aforesaid embodiments, other constructions may be used to measure document height distribution. Examples of such other constructions include a method for calculating height from the shape of a document imaged from above (U.S. Ser. No. 08/058,574), a method for calculating height from the curvature of a document by projecting a line beam on a document from an inclination (U.S. Pat. No. 5,084,661), and a method for detecting height by the amount of vertical movement of a roller or the like moving over a document.

The image reader of the present invention as claimed in claim 1 corrects height distribution data of a current reading using distribution data of a previous reading, and compared to conventional readers which are incapable of correction when accurate distribution data is lacking, the present invention is capable of correction even when there is a lack of accurate distribution data, so as to allow suitable image reproduction. The image reader of the present invention as claimed in claim 2 corrects height distribution data using the data of previously stored distribution models, so as to provide, in addition to the aforesaid effectiveness, faster scanning speed without the necessity of measuring height distribution data for each imaging operation.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image reading apparatus which reads document surfaces of open book-like documents placed on a document platen in a face upward condition and detects document height, said image reading apparatus comprising:

image reading means for reading the document placed on the document platen and for outputting image data;

height detecting means for detecting a current height distribution of the document placed on the document platen;

discrimination means for determining whether or not abnormalities occur in the current height distribution of the document detected by said height detecting means;

memory means for storing a previous height distribution of the document detected by said detecting means;

update means for updating the height distribution of the document stored in the memory means with the current height distribution of the document when abnormalities do not occur in the current height distribution of the document detected by said detecting means; and correcting means for correcting distortion of the image data caused by the current height of the document in accordance with the height distribution of the document stored in the memory means.

2. The image reading apparatus as claimed in claim 1, wherein said height detecting means comprises a mirror reflecting a side view of the document to said image reading means.

3. The image reading apparatus as claimed in claim 1, further comprising abnormalities correction means for correcting the abnormalities occurring in the current height distribution of the document, wherein said update means updates the height distribution of the document stored in the memory means when said abnormalities correction means corrects abnormalities occurring in the current height distribution of the document.

4. An image reading apparatus which reads document surfaces of open book-like documents placed on a document platen in a face upward condition and detects document height, said image reading apparatus comprising:

image reading means for reading the document placed on the document platen and for outputting image data;

height detecting means for detecting a current height distribution of the document placed on the document platen;

discrimination means for determining whether or not abnormalities occur in the current height distribution of the document detected by said height detecting means;

memory means for storing a previous height distribution of the document detected by said detecting means;

update means for updating the height distribution of the document stored in the memory means with the current height distribution of the document when abnormalities do not occur in the current height distribution of the document detected by said detecting means; and correcting means for correcting defocus arising from the current height of the document in accordance with the height distribution of the document stored in the memory means.

5. The image reading apparatus as claimed in claim 4, wherein said height detecting means comprises a mirror reflecting a side view of the document to said image reading means.

6. The image reading apparatus as claimed in claim 4, further comprising abnormalities correction means for correction the abnormalities occurring in the current height distribution of the document, wherein said update means updates the height distribution of the document stored in the memory means when said abnormalities correction means corrects abnormalities occurring in the current height distribution of the document.

7. An image reading apparatus which reads document surfaces of open book-like documents placed on a document platen in a face upward condition and detects document height, said image reading apparatus comprising:

image reading means for reading a document placed on the document platen and for outputting image data;

document change detecting means for detecting when a first document is replaced by a second document on the document platen;

height detecting means for detecting a height distribution of the second document in accordance with reading the second document after detecting a change of the document by the document change detecting means;

memory means for storing the height distribution of the second document detected by the height detecting means; and correcting means for correcting distortion of the image data caused by the height of the second document in accordance with the height distribution of the second document stored in the memory means.

8. The image reading apparatus as claimed in claim 7, wherein said document change detection means comprises a photoemitter element and a photoreceptor element.

9. The image reading apparatus as claimed in claim 8, wherein light emitted from the photoemitter element is reflected by a back surface of a document and is received by photoreceptor element, wherein a document change is detected whether or not the photoreceptor element receives light emitted from the photoemitter element between a last height distribution detection and a subsequent height distribution detection.

10. An image reading apparatus which reads document surfaces of open book-like documents placed on a document platen in a face upward condition and detects document height, said image reading apparatus comprising:

image reading means for reading a document placed on the document platen and for outputting image data;

document change detecting means for detecting when a first document is replaced by a second document on the document platen;

height detecting means for detecting height distribution of the second document in accordance with reading the second document after detecting a change of the document by the document change detecting means;

memory means for storing the height distribution of the second document detected by the height detecting means; and correcting means for correcting defocus arising from the height of the second document in accordance with the height distribution of the second document stored in the memory means.

11. The image reading apparatus as claimed in claim 10, wherein said document change detection means comprises a photoemitter element and a photoreceptor element.

12. The image reading apparatus as claimed in claim 11, wherein light emitted from the photoemitter element is reflected by a back surface of a document and is received by the photoreceptor element, wherein a document change is detected whether or not the photoreceptor element receives light emitted from the photoemitter element between a last height distribution detection and a subsequent height distribution detection.

13. An image reading apparatus which reads document surfaces of open book-like documents placed on a document platen in a face upward condition and detects document height, said image reading apparatus comprising:

image reading means for reading the document placed on the document platen and for outputting image data;

page count means for determining whether a page of the book-like document has been turned and counting pages of the book-like document which have been turned;

comparing means for comparing count value of pages with a predetermined value;

height detecting means for detecting a current height distribution of the document in accordance with a result of comparing by comparing means;

memory means for storing a previous height distribution of the document detected by the height detecting means; and correcting means for correcting distortion of the image data caused by the current height of the document in accordance with the height distribution of the document stored in the memory means.

14. The image reading apparatus as claimed in claim 13, wherein said page count means comprises a photoemitter element and a line sensor which receives light reflected by document surface from the photoemitter element.

15. An image reading apparatus which reads document surfaces of open book-like documents placed on a document platen in a face upward condition and detects document height, said image reading apparatus comprising:

image reading means for reading the document placed on the document platen and for outputting image data;

page count means for detecting and counting pages of the book-like document being turned;

comparing means for comparing count value of pages with a predetermined value;

height detecting means for detecting a current height distribution of the document in accordance with a result of comparing by compare means;

memory means for storing a previous height distribution of the document detected by the height detecting means; and correcting means for correcting defocus arising from the current height of the document in accordance with the height distribution of the document stored in the memory means.

16. The image reading apparatus as claimed in claim 15, wherein said page count means comprises a photoemitter element and a line sensor which receives light reflected by document surface from the photoemitter element.

17. An image reading apparatus which reads document surfaces of open book-like documents placed on a document platen in a face upward condition and detects document height, said image reading apparatus comprising:

image reading means for reading the document placed on the document platen on which the document is placed and for outputting image data;

height detecting means for detecting height distribution of the document placed on the document platen;

discriminating means for determining whether or not abnormalities occur in the height distribution of the document detected by the height detecting means;

memory means for storing a plurality of height distribution models;

selection means for selecting a model which is nearest the height distribution of the document detected by the detecting means when abnormalities occur in the height distribution of the document; and correcting means for correcting distortion of the image data caused by the height of the document in accordance with the model of height distribution selected by selection means.

18. An image reading apparatus which reads document surfaces of open book-like documents placed on a document platen in a face upward condition and detects document, said image reading apparatus comprising:

image reading means for reading the document placed on the document platen and for outputting image data;

height detecting means for detecting height distribution of the document placed on the document platen;

discriminating means for determining whether or not abnormalities occur in the height distribution of the document detected by the height detecting means;

memory means for storing a plurality of height distribution models;

selection means for selecting a model which is nearest the height distribution of the document detected by the detecting means when abnormalities occur in the height distribution of the document; and correcting means for correcting defocus arising from the height of the document in accordance with the model of height distribution selected by selection means.

19. A method of processing an image of an open book-like document placed on a document platen in a face upward condition, the method comprising the step of:

reading the document and outputting image data which includes a side view of the document, detecting a current height distribution of the document in accordance with the image data, storing a previous height distribution of the document in a memory, determining whether or not abnormalities exist in the current height distribution of the document, updating the height distribution of the document stored in the memory when the abnormalities did not occur in the current height distribution of the document; and correcting distortion of the image data caused by the current height of the document in accordance with the height distribution of the document stored in the memory.

20. The image reading apparatus as claimed in claim 13, wherein said height detecting means detects the current height distribution of the document when the count value of pages exceeds the predetermined value.

21. The image reading apparatus as claimed in claim 15, wherein said height detecting means detects the current height distribution of the document when the count value of pages exceeds the predetermined value.

22. A method of processing an image of an open book-like document placed on a document platen in a face upward condition, the method comprising the step of:

reading the document placed on a document platen, and outputting image data which includes a side view of the document;

detecting a current height distribution of the document in accordance with the image data;

determining whether or not abnormalities exist in the current height distribution of the document;

storing a previous height distribution of the document in a memory;

updating the height distribution of the height distribution stored in the memory when abnormalities did not occur in the current height distribution of the document; and correcting defocus caused by the current height of the document in accordance with the height distribution of the document stored in the memory.

23. An image reading apparatus, having a document platen, to read document surfaces of an open book-like document having a plurality of pages when such book-like documents are placed on the document platen in a face upward condition and to detect a document height, said image reading apparatus comprising:

image reading means for reading a book document placed on the document platen and for outputting image data;

document change detecting means for detecting when a first book document is removed from the document platen and a second book document is subsequently placed on the document platen;

height detecting means for detecting a height distribution of the second book document, in accordance with reading the second book document, after detecting a book document change by the document change detecting means;

memory means for storing the height distribution of the second book document detected by the height detecting means; and correcting means for correcting distortion of the image data, caused by the height of the second book document, in accordance with the height distribution of the second book document stored in the memory means.

24. An image reading apparatus, having a document platen, to read document surfaces of an open book-like document having a plurality of pages when such book-like documents are placed on the document platen in a face upward condition and to detect a document height, said image reading apparatus comprising:

image reading means for reading a book document placed on the document platen and for outputting image data;

document change detecting means for detecting when a first book document is removed from the document platen and a second book document is subsequently placed on the document platen;

height detecting means for detecting a height distribution of the second book document, in accordance with reading the second book document, after detecting a book document change by the document change detecting means;

memory means for storing the height distribution of the second book document detected by the height detecting means; and correcting means for correcting defocus, arising from the height of the second book document, in accordance with the height distribution of the second book document stored in the memory means.

* * * * *